United States Patent [19]
Thompson et al.

[11] Patent Number: 5,491,797
[45] Date of Patent: Feb. 13, 1996

[54] SCHEDULABLE AUTOMATICALLY CONFIGURED VIDEO CONFERENCING SYSTEM

[75] Inventors: Phillip F. Thompson, Sheffield Lake, Ohio; Howard D. Finck, Farmington Hills, Mich.; Donald K. Sheppard, Canton, Mich.; Gregory G. DeHetre, Livonia, Mich.

[73] Assignee: Qwest Communications, Denver, Colo.

[21] Appl. No.: 983,454

[22] Filed: Nov. 30, 1992

[51] Int. Cl.⁶ .............................. G06F 13/10; G06F 13/14
[52] U.S. Cl. ........................................................ 395/200.03
[58] Field of Search ................................ 370/100.1, 94.3, 370/62, 94.1, 104.1, 57, 59, 62; 395/600, 200, 800; 379/58, 67, 202, 189, 389; 348/6, 7, 10, 3; 364/401, 514 A, 514 C

[56] References Cited

U.S. PATENT DOCUMENTS

| | | | |
|---|---|---|---|
| 4,455,455 | 6/1984 | Little | 379/203 |
| 5,014,267 | 5/1991 | Tompkins et al. | 370/62 |
| 5,151,782 | 9/1992 | Ferraro | 348/7 |
| 5,311,423 | 5/1994 | Clark | 364/401 |

OTHER PUBLICATIONS

NX 6456, T1 & FT1 Multiplexer, User's Manual, Astrocom Corporation, Sep., 1991.
*531 T–Carrier Cross–Connect System (TCS)*, I. General Description, Technical Manual 76-0531/1, Tellabs Copyright 1986.

*53X T–Carrier Cross–Connect System (TCS)*, II. Applications Manual, Technical Manual 76-053X/2, Tellabs Copyright 1986.

*M–8000 Multipoint Bridge Director Panel*, Operations Guide, PictureTel Copyright 1990, 1992.

*M–8000 Multiport Bridge*, Installation and Servicing Guide, PictureTel Copyright 1990, 1991.

*NX6456, T1 and FT1 Multiplexer*, User's Manual, Astrocom Corporation Copyright 1991.

Primary Examiner—Alyssa H. Bowler
Assistant Examiner—Charles R. Kyle
Attorney, Agent, or Firm—Townsend and Townsend and Crew

[57] ABSTRACT

A videoconferencing network system that provides schedulable, automatic interconnectivity between a selectable user sites. The network system places the user in direct control of all aspects of the conference. Minimum videoconferencing equipment, including a video terminal, a camera, and a telephone line, enable the user to directly schedule, change, initiate, and monitor video conferences with remote stations. Direct user control and the network's automatic link path implementation greatly reduce delays and costs.

7 Claims, 2 Drawing Sheets

SCHEDULABLE AUTOMATICALLY CONFIGURED VIDEO CONFERENCING SYSTEM

BACKGROUND OF THE INVENTION

The present invention relates in general to videoconferencing networks, and in particular to a network system that provides efficient and fully automated videoconferencing subscription services.

Videoconferencing networks allow communication between several remote participants through an audio/video medium where the participants are able to view and converse with one another in the correct direction. A point-to-point videoconferencing network requires audio/video equipment at each of the two locations in addition to the hardware required for transmission/reception of signals over communication channels.

Multi-location videoconferencing networks allow multiple locations to communicate with each other interactively. A central station connected to all participating terminals controls the interconnections and communication channels. In these systems each participating location is required to carry a minimum of terminal equipment including a camera, a monitor, and the standard microphone/speaker means.

The costs associated with owning and maintaining such multi-point videoconferencing networks however can be prohibitively high for most users. As a result, videoconferencing services have developed whereby users subscribe to a network for conducting videoconferences. However, the network systems in the existing videoconferencing subscription services suffer from a number of drawbacks.

The network systems in the existing videoconferencing services do not provide the user with direct control over the scheduling of conferences. The user is therefore required to go through an intermediary for setting up a videoconference. This means that the conference scheduling information, as well as any subsequent changes or cancellations would have to first be submitted to a system administrator. Further delays are caused by the fact that implementation of network link paths are not automated. Upon the receipt of the scheduling information, the system administrator manually configures the network switches to implement the interconnections.

Also, because the user is not able to directly monitor network operation during the conference, the user has to again rely on, and wait for a system administrator to produce a record of the conference upon which connection charges are based. In some instances the user is still required to invest in expensive interconnect hardware such as video bridges.

Therefore, existing videoconferencing services involve complex reservation systems and inefficient network structures that have added to administrative costs and delays.

SUMMARY OF THE INVENTION

The videoconferencing network system of the present invention is designed to provide users with convenient, versatile and cost effective videoconferencing subscription services. The present invention utilizes computers that run especially developed software modules to create a unique and fully automated videoconferencing network system based on industry standard videoconferencing equipment.

In a preferred embodiment, the present invention provides a network system that includes all the major videoconferencing equipment such as video bridges, cross-connect switches and network gateways. Therefore, the user is only required to maintain a camera, a video terminal, and an access line to the transmission network.

Furthermore, the network system of the present invention places complete control over conference scheduling in the hands of the user directly. Through easy-to-use direct access methods such as a personal computer, integrated on-screen touch sensitive interface, and/or speech recognition interface, the user is able to schedule a new conference, add or delete conference sites to a previously scheduled conference, change the start time or the duration of a conference, or cancel a conference directly from the interface. There is no minimum time required between scheduling and initiating the actual videoconference.

The network system of the present invention also allows the user to select the configuration as well as the transmission speed for each conference. Three different configurations are available: point-to-point interactive in which two sites can see and converse with each other, multipoint broadcast in which one site broadcasts to two or more other sites, and multipoint interactive in which three or more sites can see and converse with each other. Transmission speeds are available at 128,384, or 768 kilobits per second and 1.544 megabits per second via a nationwide fiber optic network.

The network system's automatic network link path implementation greatly reduces delays associated with the actual interconnection process.

Another feature of the network system of the present invention allows the user to monitor the use of the network by providing on-line conference call detail reports. Detailed conference information includes the conference identification code, description of the conference, the locations involved, the date of the conference, the start and end times, and the duration of each conference. This feature simplifies allocation of connection charges and provides for a highly efficient and accurate billing system with no delays.

Accordingly, in a preferred embodiment, the videoconferencing network system of the present invention provides for schedulable, automatic interconnectivity between a selectable group of a plurality of user videoconferencing sites (UVS), each having videoconferencing hardware including at least an audio/video receiver and a data service unit (DSU). The network system comprises: UVS control means for providing the user with direct access to the network system and control over the UVS videoconferencing hardware and for generating user scheduling information and user site selection information; a plurality of remote network devices configurable to provide a plurality of network link path options; distributed network database means for storing user data including the user scheduling information and user site selection information, and network data including availability status information that indicates availability of the plurality of remote network devices; and a distributed network controller coupled to the distributed network database means which further includes: local user interface means for providing services for the UVS to the distributed network controller, including access to the distributed network database means, automatic scheduling means for generating final conference scheduling data, including times and sites, based on the user scheduling information and the availability status information, and connection/disconnection means for receiving the final conference scheduling data, allocating a network link path, and generating a set of network commands in response to the received scheduling data.

The network system further comprises: a plurality of remote network controllers for implementing the network link paths by configuring the remote network devices according to the network commands generated by the distributed network controller, and a distributed network communication control system connecting the UVS control means, the distributed network database means, the distributed network controller, the remote network devices, and the remote network controllers for transferring information and commands therebetween.

A further understanding of the present invention may be had with reference to the description and diagrams below.

DESCRIPTION OF THE PREFERRED EMBODIMENT

The videoconferencing network system of the present invention can be divided into three basic computer systems. The first computer system is referred to as the host system which makes up the heart of the network. The host computers are responsible for the scheduling of conferences and the connection/disconnection of the conferences. The second system is comprised of the user computers. These computers are disposed at user sites and run a user interface program that communicates conference scheduling requests to the host system. Finally, the third computer system is made up of the remote (or field) computers that control all of the field network devices (such as cross-connect switches and video bridges), where the actual connection and disconnection of the conference take place. The operating system for all three computer systems is UNIX, and the computers run QNX relational data base management system.

The operation of the network system, in general terms, is as follows. The user computers run a special software module, referred to as the local communication manager, which allows the user to directly control the use of the network, including conference scheduling and monitoring. The user computers send the user conference information to the host computers that act as network controllers. The network controllers, with the help of a network data base that stores all network information (e.g. available network resources), generate a set of network commands in response to the user conference information. These network commands dictate when, at what locations and in which configuration connections and disconnections of network devices (e.g. cross-coupled switches) are to be implemented across the network.

All the network devices of the present invention, including switches, video bridges and network gateways, are microprocessor based and can therefore be automatically configured. Upon generating the set of network commands, the network controllers send the commands to those remote network controllers that are attached to the participating remote network devices. The remote network controllers then automatically configure the particular network devices to which they are attached, according to the network commands. Once the network is configured, all the video conferencing sites that have been requested by the user are interconnected, and videoconferencing can begin at the scheduled time. The network system of the present invention uses the public network T1 digital carrier system or a nationwide fiber optic network as the transmission medium.

Figure 1:
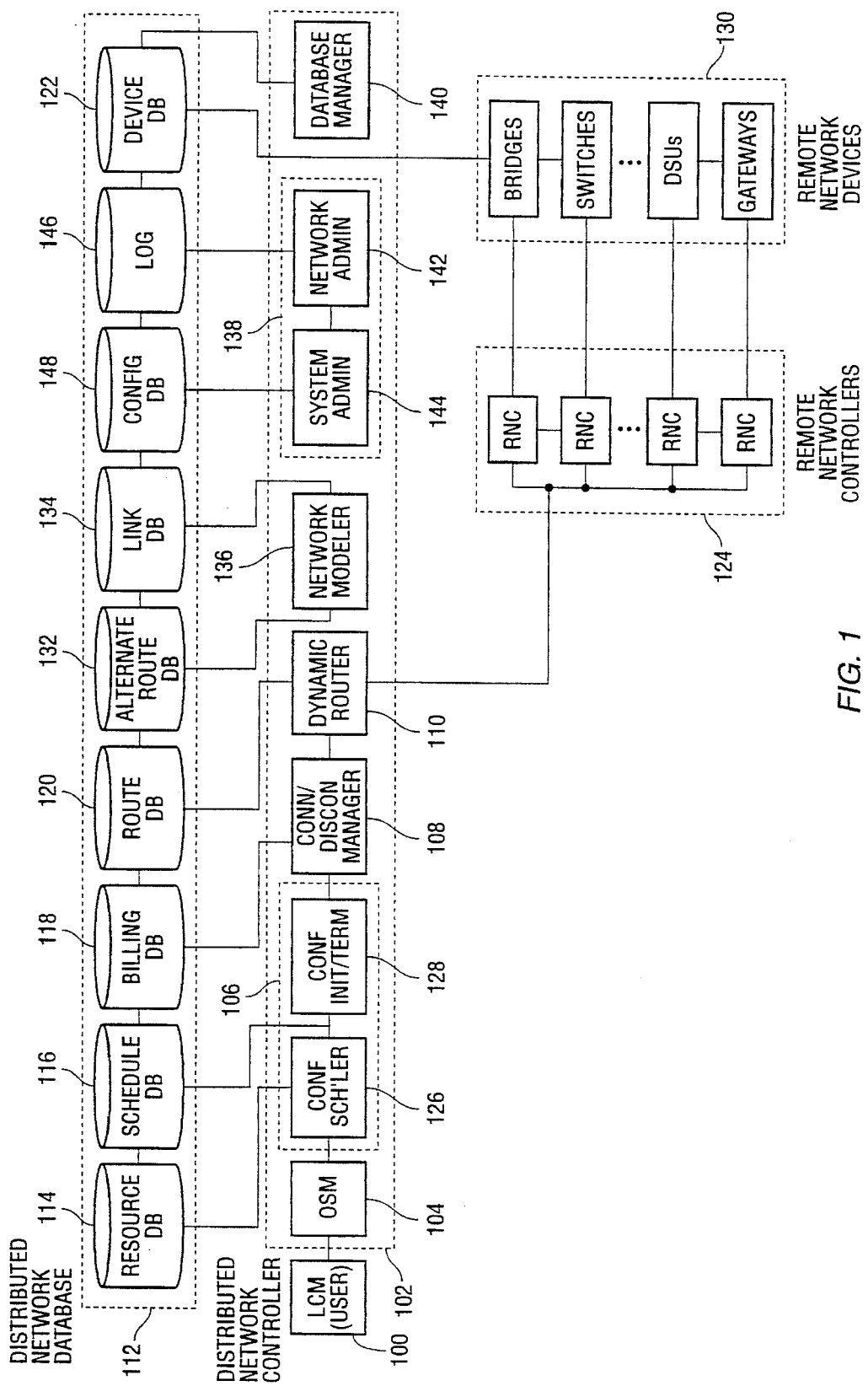
FIG. 1 is a block diagram illustrating the system overview of the videoconferencing network system of the present invention.

FIG. 1 illustrates the operation of the preferred embodiment of the videoconferencing network system of the present invention. Each user videoconferencing site includes an interface unit such as a personal computer. A local communication manager (LCM) 100 facilitates user interface through the interface unit. LCM 100 is a user friendly selection mechanism (i.e. menu driven) that allows the user to list currently scheduled conferences, list company and location directories, and schedule conferences. The user computer then transmits this information to a distributed network controller 102 which forms part of the host computer and is distributed at different locations across the network. Distributed network controller 102 also connects to a distributed network database 112 throughout the network.

Distributed network controller 102 is the heart of the network system and includes several modules: an on-line session manager (OSM) 104, an automatic scheduler 106, a connection/disconnection manager (C/DM) 108, a dynamic router 110, a network modeler 136, a network operation controller 138, and a database manager 140. OSM 104 receives user information from LCM 100 and acts as a local interface unit allowing transfer of user information from LCM 100 to the host computers and network information from the host computers to LCM 100. OSM 104 transfers user information to an automatic scheduler 106. Resource database 114 is one portion of distributed network database (DND) 112 that stores status information on all available network resources and provides this information to the conference scheduler 126. Automatic scheduler 106 includes a conference scheduler 126 that generates a final conference schedule based on user scheduling requests and the status information on availability of the network resources. The generated schedule is fed back into DND 112 and stored in a schedule database 116. Automatic scheduler 106 also includes a conference init/terminator 128 that receives the final schedule information to initiate or terminate a conference accordingly.

The output of automatic scheduler 106 connects to connection/disconnection manager (C/DM) 108 that is responsible for the connection and disconnection of conferences at the host. Upon receiving the final conference schedule and the initiate signal from automatic scheduler 106, and with the help of a dynamic router 110, C/DM 108 allocates an optimum network link path based on the available resources at the requested times. To implement the designated link path, network controller 102 generates a set of network commands at its output. Dynamic router 110 draws from a route database 120 portion of DND 112 that stores the most efficient route within the network by which a particular link path can be formed. C/DM 108 also connects to a number of other sections of DND 112, including a billing database 118 that helps calculate conference charges. Database manager 140 is responsible for organizing, updating and maintaining all data stored in distributed network database 112.

The set of network commands generated at the output of network controller 102 drive remote network controllers 124 that connect to remote network devices 130. Remote network controllers 124 interpret the network commands and instruct the participating remote network devices to obtain the desired configuration. Remote network devices 130 comprise the networking hardware such as data service units, cross-connect switches and video bridges (described in connection with FIG. 2). Each one of remote network devices 130 transmit their status to DND 112 to be stored at a device database 122. This information is used by the network operation controller 138 that monitors the network system operation.

At this point, the network is configured, the link paths are formed and videoconferencing can begin. Any other communication between the user and the network system, such as schedule changes or cancellations, will be affected through the same procedure. Billing database 118 and device database 122 allow the user to monitor the use of the network any time during the conference through LCM 100.

The function of network modeler 136 is to maximize network efficiency. Network modeler 136 collects user request information, and analyzes request patterns and peak demands to determine the most efficient network configuration and trunk group size for a variety of network conditions. Based on this analysis, network modeler 136 creates route database 120. In its operation, network modeler 136 communicates with a link database 134, which stores all possible link path formations, and an alternate route database 132, which stores alternate backup routes in case of trunk failures. Network modeler 136 also models various network configurations necessary to support a variety of different traffic patterns, and creates models in response to forecasted network blockages or equipment overloads.

Network management is performed by network operation controller 138. This module includes a network administrator 142 that connects to a log database 146, and a system administrator 144 that connects to a configuration database 148. Network administrator 142 controls system on-line operation and monitors functionality of system hardware. System administrator 144 processes newly added users and network devices.

Figure 2:
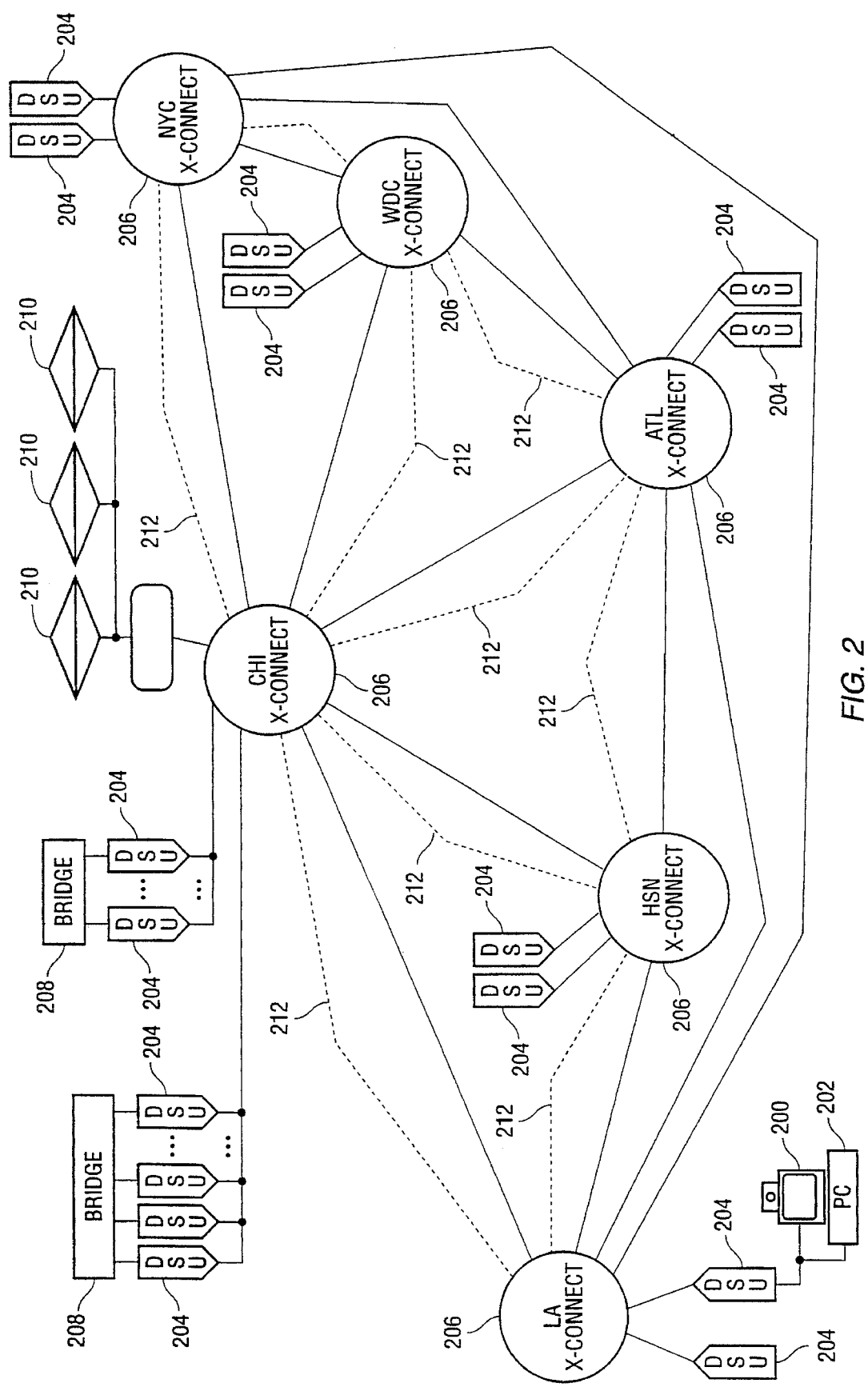
FIG. 2 shows one example of a network physical configuration based on the videoconferencing network system of the present invention.

FIG. 2 shows one example of a network physical configuration based on the videoconferencing network system of the present invention. This network interconnects six videoconferencing sites, including Los Angeles, Houston, Chicago, Atlanta, Washington D.C., and New York City via the public network T1 digital carrier system. Different trunk groupings and link path options yield a number of different combinations of routings between the sites.

To conduct multi-point videoconferencing, each user needs audio/video receiver and transmitter 200 and an interface unit 202 such as a personal computer. To access the transmission medium, the user also needs a T1 access line and a data service unit (DSU) 204. DSU 204 is a multiport T1 multiplexer that facilitates data transmission over T1 lines. The videoconferencing network system of the present invention provides variable bandwidth to support data transmission at different speeds. The user can select the bandwidth through LCM 100 (FIG. 1). Transmission speeds are available at, for example, 128,348, or 768 kilobits per second. An example of a data service unit product that allows the user to utilize this bandwidth on demand feature is the Astrocom NX1 (1 port) or NX6456 (4 port) T1 multiplexer.

The network system of the present invention provides all the rest of the required videoconferencing hardware. There is a digital cross-connect system 206 (a remote network device 130 in FIG. 1) installed at each videoconferencing site that is controlled by a network controller 124 (FIG. 1). An example of a microprocessor-based cross-connect system is Tellabs 531 TCS that provides cross-connections between, and test access to, the DS0 channels of multiple T-carrier facilities. Transmission channels from remote sites as well as those from local DSUs 204 connect to the several ports of each digital cross-connect system 206, respectively.

When more than two sites are connected in an interactive conference, video bridges 208 (another remote network device 130 in FIG. 1) are necessary. Bridge 208 hardware supports more than one active conference at a time, and has multiple ports for multiple sites to be connected to. All bridge 208 hardware can be installed in a more central site (e.g. Chicago) where a digital cross-connect system 206 enables all other sites to have access to the several ports of bridge 208 via DSUs 204. An example of a bridge 208 is PictureTel M-8000 Multipoint Bridge which allows as many as sixteen videoconferencing sites to participate in a videoconference.

To enable the videoconferencing network system of the present invention to connect to other separate independent videoconferencing networks, gateways 210 are utilized. These network devices (130 in FIG. 1) are also located in the central site, and allow inter-network connection via dial-out facilities through switched 56 kilobit data lines. Gateways 210 such as dial gateways or Sprint gateways, make international videoconferencing possible.

This embodiment of the network configuration also provides a network safety net. In case any of the automatic links fails, secondary links 212 can be manually configured to avoid loss of connectivity.

This network configuration enables a user at any one of the network sites to directly initiate a point-to-point videoconference between, for example, New York City and Houston. This embodiment of the network would connect the two sites via Chicago or Atlanta, whichever allows for more efficient communication. A multipoint interactive videoconference can be conducted, for example, by adding Chicago to the conference schedule. Video bridges 208 would be utilized to interconnect all three sites. A third type of videoconferencing made available by the network of the present invention is multipoint broadcasting, where one site, for example Chicago, broadcasts to two or more other sites. A user may select any one of these options, along with the desired times and participating sites, and transmission speed through the LCM 100 (FIG. 1), and the network system automatically configures the network.

In conclusion, the present invention offers a versatile and fully automated videoconferencing network system that places the user in direct control of all aspects of videoconferencing. While the above is a complete description of the preferred embodiment of the present invention, it is possible to use various alternatives, modifications and equivalents. For example, in addition to T1 carrier system, nationwide fiber optic networks can be used for the transmission medium. Also, dedicated gateways can become part of the network system of the present invention in place of dial-out or Sprint gateways. Therefore, the scope of the present invention should be determined not with reference to the above description but should, instead, be determined with reference to the appended claims, along with their full scope of equivalents.

What is claimed is:

1. A videoconferencing network system for providing schedulable, automatic interconnectivity between a selectable group of a plurality of user videoconferencing sites connectable by public digital transmission network link paths, each having videoconferencing hardware including at least an audio/video receiver and a data service unit, said network system comprising:

user control means for providing the user with direct access to the network system and control over the user videoconferencing hardware and for generating user scheduling information and user site selection information;

a plurality of remote network devices automatically configurable to provide a plurality of network link path options, said plurality of remote network devices comprising:

a plurality of cross-connect switches selectively coupled together via the public digital transmission network; and at least one bridge device coupled to a selected one of said plurality of cross-connect switches, said bridge device facilitating interactive video conferencing between more than two sites;

a distributed network controller for generating a set of network commands in response to said user scheduling and site selection information, said distributed network controller comprising:

an automatic conference scheduler coupled to said user control means, said automatic conference scheduler generating final conference scheduling data, including user selected times and sites;

a conference initiator/terminator coupled to said automatic conference scheduler;

a connection/disconnection manager coupled to said initiator/terminator; and a dynamic router coupled to said connection/disconnection manager;

a distributed network database comprising:

a resource database coupled to said automatic conference scheduler, said resource database storing status information on all network resources;

a schedule database coupled to said automatic conference scheduler for storing conference schedule information generated by said automatic conference scheduler; and a route database coupled to said dynamic router for storing information defining an optimum route to implement for each selected link path between the plurality of videoconferencing sites; and a plurality of remote network controllers coupled to said dynamic router and to said plurality of remote network devices, for automatically configuring said plurality of remote network devices in response to said set of network commands;

wherein, the system allows a user to automatically schedule and monitor point-to-point and multi-point two-way video conferencing between the plurality of videoconferencing sites.

2. The network system of claim 1 wherein said user control means further comprises a menu-driven interface mechanism allowing the user to automatically schedule, change or cancel a plurality of videoconference times and sites.

3. The network system of claim 2 wherein said interface mechanism can be one of a plurality of standard interface systems including a personal computer, speech recognition interface, or integrated on-screen touch sensitive interface.

4. The network system of claim 1 wherein said distributed network controller further comprises:

an operation control sub-system, including a network administrator for controlling system on-line operation, and a system administrator for adding new users and new devices, and updating said distributed network database means; and a conference transaction recorder for compiling all essential conference information including identification of the scheduling user and other participating sites, description of conference, date, start and end times, and duration of conference, said network controller generating a conference transaction report detailing said information upon completion of each conference.

5. The network system of claim 1 wherein said plurality of remote network devices further comprise gateways for connecting the videoconferencing network to other videoconferencing networks.

6. The network system of claim 1 wherein said distributed network database further comprises:

a network link database coupled to said route database, said link database storing all possible network link path formations; and an alternate route database coupled to said route database, said alternate route database storing alternate backup routes in case of link failures.

7. The network system of claim 6 wherein said distributed network controller further comprises a network modeler coupled to said alternate route database and said network link database, wherein said network modeler analyzes network usage including request patterns and peak demands, and based on information stored in said alternate route database and network link database, generates said optimum route stored in said route database.

* * * * *